Nov. 13, 1962 R. A. HALL 3,063,418
WASTE CATCHING DEVICES
Filed Nov. 9, 1960 2 Sheets-Sheet 1
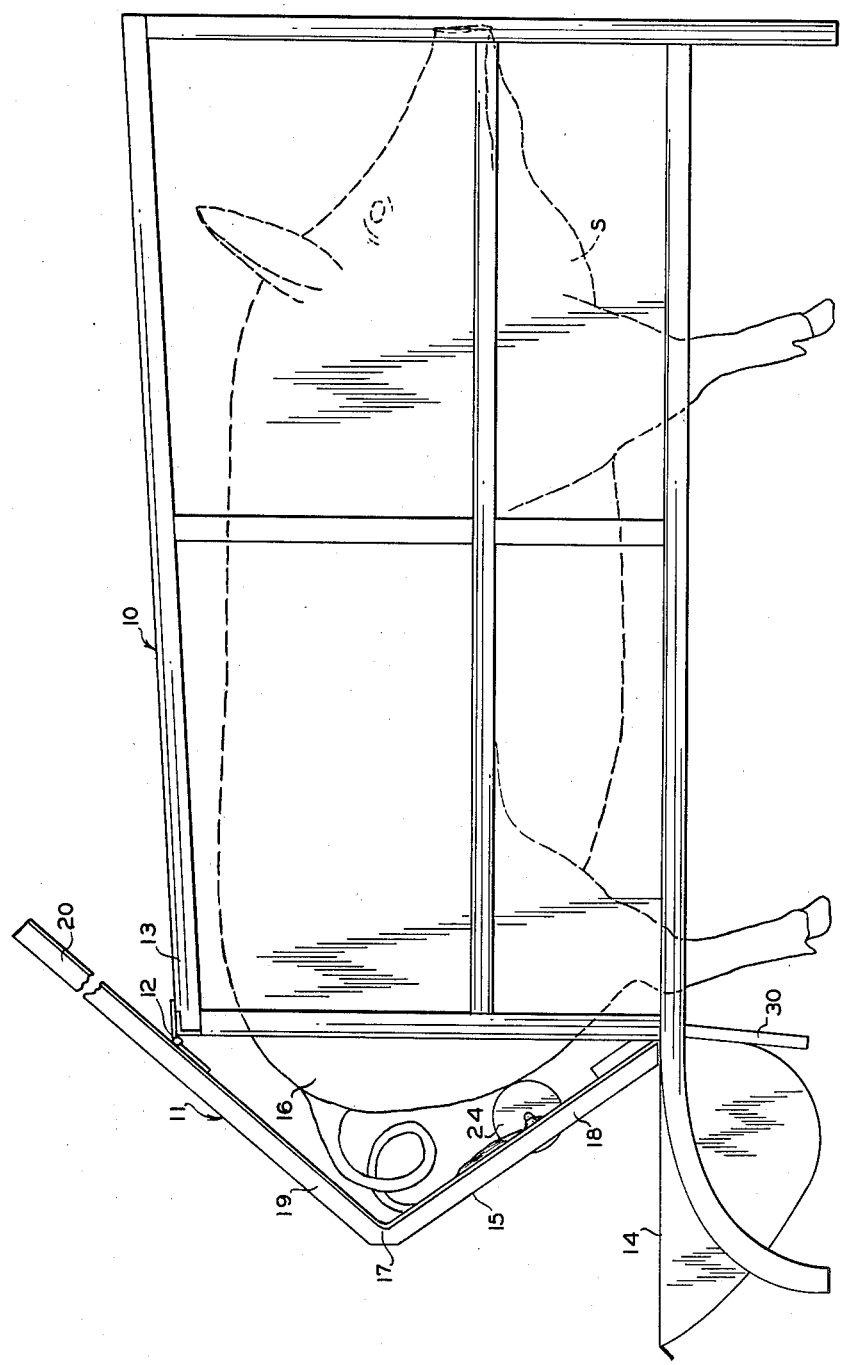
Fig. 1
INVENTOR.
RICHARD A. HALL
BY 
ATTORNEY Nov. 13, 1962   R. A. HALL   3,063,418
WASTE CATCHING DEVICES
Filed Nov. 9, 1960   2 Sheets-Sheet 2
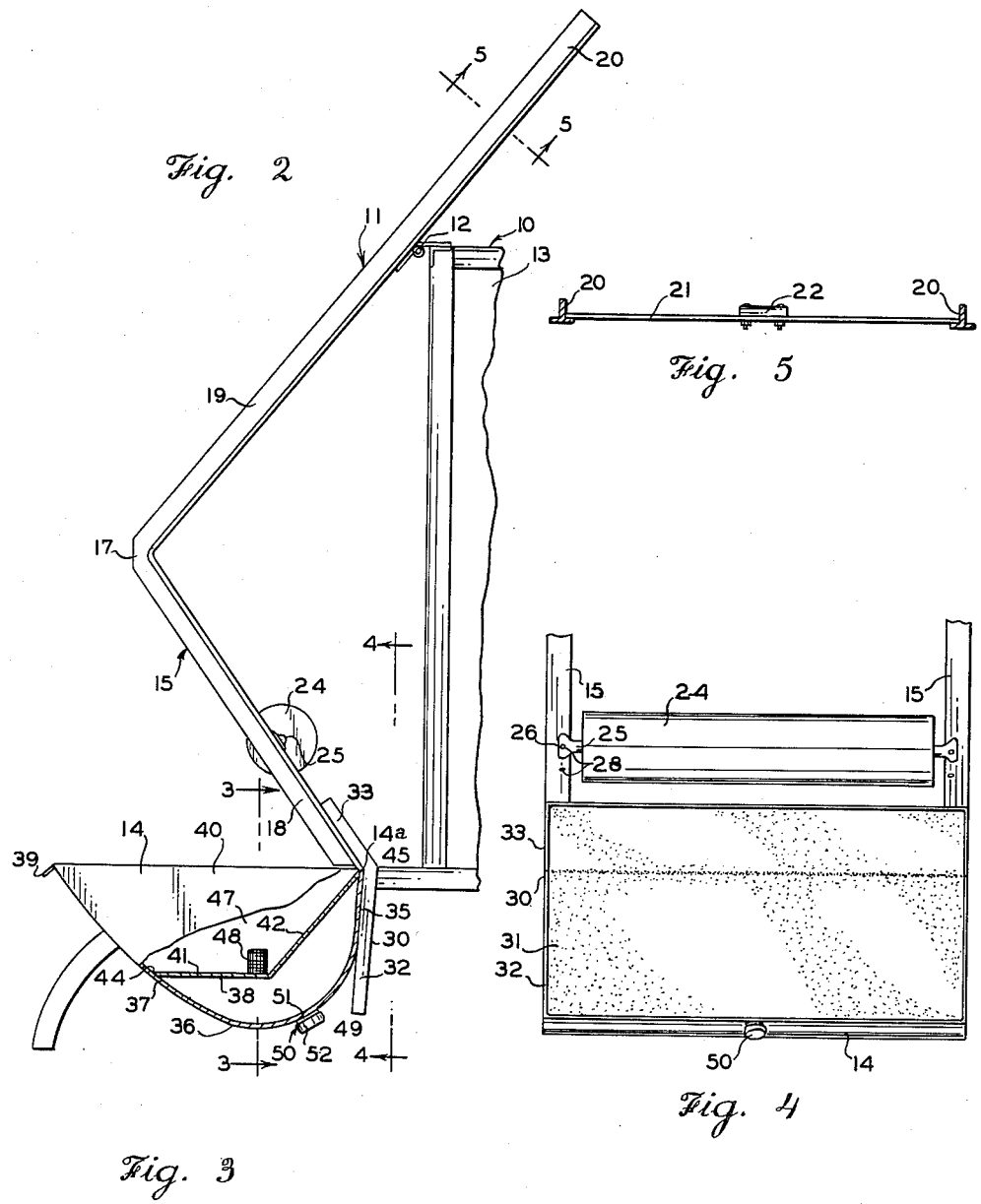
INVENTOR.
RICHARD A. HALL
BY
ATTORNEY

United States Patent Office 3,063,418
Patented Nov. 13, 1962

3,063,418
WASTE CATCHING DEVICES
Richard A. Hall, Conyers, Ga., assignor to The Monastery of The Holy Ghost, Inc., Conyers, Ga.
Filed Nov. 9, 1960, Ser. No. 68,236
7 Claims. (Cl. 119—95)

This invention relates to waste catching devices, and is more particularly concerned with a device which is attached to a farrowing crate to catch the metabolic waste products of a sow therein.

When a sow has been bred and the pigs are to be born, the sow is placed in a farrowing crate to facilitate handling of the birth of the pigs. Thereafter, the sow remains in the crate to allow the pigs to suckle, and to prevent the sow from lying on and crushing the little pigs. Though the conventional farrowing crate is rather successful in its intended purposes, the problem of sanitation is greatly increased. Since the sow must remain in one place for an extended period of time, the metabolic wastes accumulate and must be removed frequently. Usually, an absorbent material such as wool shavings is spread on the floor to absorb moisture and keep the pen as sanitary as possible between cleanings. This causes added difficulty in cleaning the pen.

Though a restraining bar is placed across the rear of the farrowing crate, there is usually sufficient room in the rear of the crate so that, when the sow lies down, there is possibility of her crushing a little pig which might be in the rearmost portion of the crate.

It is therefore a primary object of the present invention to provide a waste catching device which may be used in conjunction with a farrowing crate.

Another object of the present invention is to provide a waste catching device which will catch a very large proportion of the metabolic wastes from a sow in a farrowing crate.

Another object of the present invention is to provide a waste catching device which allows maximum activity of a sow in a farrowing crate, without hindrance or chaffing.

A further object of the present invention is to provide a device which acts as a gate to a farrowing crate and prevents little pigs from being crushed by the sow.

A still further object of the present invention is to provide a waste catching device which is very easily cleaned.

And a further object of the present invention is to provide a waste catching device which is easily adaptable to be used in conjunction with any conventional farrowing crate.

Another object of the present invention is to provide a waste catching device which is inexpensive to manufacture, simple to operate, and very efficient in operation.

Numerous other objects, features and advantages of the present invention will become apparent from consideration of the following specification taken in conjunction with the accompanying drawings, in which:

FIG. 1 is a side elevational view of one form of the present invention installed on a conventional farrowing crate.

FIG. 2 is a side elevational view of the device as shown in FIG. 1, partially in cross section, and having the farrowing crate broken away.

FIG. 3 is a cross sectional view taken on the line 3—3 in FIG. 2.

FIG. 4 is a partial front elevational view taken on the line 4—4 in FIG. 2.

FIG. 5 is a cross sectional view taken on the line 5—5 in FIG. 2.

Briefly, the present invention comprises a rearwardly swingable compartmented container mounted on the rear of a farrowing crate. Means are disposed above the container to prevent the sow from being caught on or scratched by the container when she attempts to lie down; and padding is provided to prevent chaffing of the sow as she moves inside the crate.

Drains provide for the separation of the liquid from the solid and retaining such in a separate compartment, and the liquid is substantially enclosed to prevent inadvertent spilling or splashing. Means are provided to facilitate the emptying of the liquid compartment.

Referring now more particularly to the drawings, a sow S is disposed within a conventional farrowing crate 10. The waste catching device of the present invention generally designated 11 is attached by hinges 12 to the rear portion 13 of the crate 10 and includes a trough-like container 14 having a forward edge portion 14a and across the rear of the crate, normally at about ground level, suspended by spaced, somewhat L-shaped arms 15, and so positioned that, when the sow is standing (as in FIG. 1) the container 14 will be well under the posterior portion 16 of the sow S so that either the feces or the urine will be deposited in the container 14. Thus there is substantially no room for little pigs to be present under her portion 16 and be harmed when she lies down.

The arms 15 which carry the container 14 near the forward edge portions are each made up of a lower portion 18, a rearwardly directed apex portion 17, and an upper portion 19, hinged to the crate by the hinges 12. Due to the weight of the apex portion and of the container as a whole, the device tends to pivot forward of the position shown in FIG. 1. The lower portion 18 is consequently diagonally disposed and thus does not interfere with or chaff the posterior portion 16 of the sow, and yet allows the container 14 to be well under her posterior. The upper portions 19 of the arms 15 angle forwardly toward the crate 11 for hinging to the crate, as above described, and extend past the hinges 12 to form counterweight portions 20. A bar 21 carrying a weight 22 may be mounted transversely to the counterweight portions 20 for rigidity of the device 11 as well as for somewhat balancing purposes.

Above the container 14 and on and between the arms 15 is a roller 24 of hardwood, metal tubing, or the like mounted for rotation on an axle 25, the latter being removably attached to the arms 15 as by say bolts 26 in holes 28 along the arms to provide for adjustment of roller 24 in a vertical and longitudinal direction with respect to the crate so that proper positioning of the roller with respect to the sow may be accomplished.

Immediately forward of container 14 and secured fast with respect thereto is a frame 30 which holds a soft pad 31 of foam rubber or comparable material. The frame 30 and pad 31 are so located that the pad 31 will rest against the hind legs of the sow to prevent chaffing which may be caused by the hard surface of the container 14. Thus the pad includes a lower nearly vertical part 32 at the container and an upper part 33 rearwardly inclined.

Referring to FIGS. 2, 3 and 4 of the drawings, it will be seen that the container 14 is formed from a sheet material. A single piece of material forms the front 35, the curved bottom 36 and the slanted rear portion 37. The rear edge is turned outwardly to form a flange 39 to give strength to the edge. Side walls 40 are attached to each end of the sheet material, as by welding, to make the container water-tight.

Within the container 14, toward the bottom thereof is a divider or false bottom 38 having a substantially horizontal portion 41 and an upwardly and forwardly slanting portion 42 whose edges 44 and 45 and 44a and 45a are mounted on the container walls to form a water-tight seal. On the portion 41, at each end thereof, is an opening 46 covered by a strainer 48, which prevents solids from passing through the openings 46. Thus the divider provides an upper solid-holding compartment 47 and a lower liquid holding compartment 49.

Centrally of the lower compartment 49 is a drain 50 comprising a pipe nipple 51 in the bottom 36 and having an exterior cap 52, to provide a simple means for emptying the accumulated liquid from the compartment 49.

In operation the device 11 is lifted, or swung upwardly, pivoting at hinges 12, to allow the sow to enter the crate 10. The device is then lowered. The weight of the arms 18 and 19, and the weight of the container 14 is such that it is just enough to force the device in a counterclockwise direction, as viewed in FIGS. 1 and 2. The weight 22 on bar 21 takes most of the force off the sow in order to prevent discomfort.

When the sow is standing, either the smooth roller 24 will be against the posterior portion 16, or the pad 31 will be against the rear legs. In either case, the surfaces are such that they will not chaff the sow.

When the sow defecates, the feces will fall into the container 14 and remain on the divider 38. When the sow urinates, the urine will fall into the container 14 on the divider 38, then will flow through openings 46, the strainer 48 holding back the solid matter in the upper compartment.

If the sow sits or lies down, the posterior portion of the sow will engage against the roller 24 and cause the entire device 11 to pivot outwardly so that she will not touch the forward edge of the container 14. Also, the outward movement of the device will tend to push out of the way any little pigs which may be close enough to be harmed.

Due to the configurations of the arms 15, the usual rear restraining bar may be omitted, and the device 11 acts as a gate. When the device is pivoted clockwise as viewed in the drawings, the lower arm portions 18 will become nearly vertical and they, with the pad, will restrain the sow in her rearward movement.

Since the lower compartment for liquid is substantially enclosed, even though the device is pivoted back and forth by frequent movement, the liquid is retained. If the container 14 be tilted by swinging of the device, the liquid will remain in the forward portion of the compartment 49, held by the partition 42 of the divider 38.

To clean the device, one need but unscrew cap 52 and allow the liquid to run out. If preferred, a hose may be permanently attached to the drain to allow the liquid to drain out rather than accumulate. A rake may be used to clean out the solid material from the upper portion by simply raking the material over the rear wall 37.

Thus, it will be seen that the present invention provides a device which will act very efficiently to catch and hold the metabolic wastes of a sow in a farrowing crate.

It performs the function of restraining the sow, while allowing maximum activity. The device is easily cleaned, and causes no discomfort to the sow. It has been found that the present device may catch about 90% of the excrements of the sow in a farrowing crate.

It will be understood that the present invention is in no way restricted to the particular form herein disclosed; but, in the practice of the invention, numerous changes and modifications may be made, and the full use of equivalents resorted to without departing from the spirit or scope of the invention as outlined in the appended claims.

I claim:

1. An attachment for a farrowing crate comprising a pair of L-shaped arms lying in substantially parallel planes and having rigidly connected lower and upper portions, the latter being adapted to be pivotally mounted respectively on the upper rear corner portions of the crate and extend downwardly and rearwardly therefrom while said lower portions extend downwardly and inwardly from the ends of said upper portions, an upwardly open container mounted on the lower portions to hang transversely and rearward of the crate near ground level for catching waste from a sow within the crate, and cushioning means transverse to the arms for preventing the sow from coming in chafing contact with the container.

2. An attachment for a farrowing crate comprising spaced suspension arms adapted to be pivotally mounted on the upper rear portion of the crate for rearward swinging, an elongated trough-like container carried on the arms for hanging transverse to the rear of the crate for catching waste from a sow within the crate, and a roller mounted on the arms axially transverse the arms and parallel with the container and above same for engagement with the posterior of the sow so that when the sow moves rearwardly and the roller and arms swing rearwardly the trough may be swung from behind the legs of the sow without chafing the sow.

3. In combination, a farrowing crate having upper rear corner portions, two generally rigid L-shaped arms having upper, lower and rearwardly projecting apex portions and mounted at arm upper portions on said corner portions for rearward swinging, an upwardly open container mounted on the lower arm portions transverse to the crate and near ground level, a roller mounted on the lower arm portions above the container and a pad on the container, both to engage rear portions of a sow within the crate, said compartment having a false bottom, and strainer means in the false bottom, the upper portions of the arms extending above and forward of the crate for counterweight to balance said apex portion so that the container normally hangs with little force tending to force the container toward the sow.

4. In combination, a farrowing crate having upper rear corner portions, two generally rigid L-shaped suspension arms having upper, lower and rearwardly projecting apex portions and mounted at arm upper portion on said corner portions for rearwardly swinging, an upwardly open container to catch waste mounted on the lower arm portions transverse to the crate and normally hanging near ground level, the arms and container normally being in a position tending to engage from her rear a sow within the crate, a roller mounted on the lower arm portions above the container and a pad on the container, both to engage rear portions of the sow, said compartment having a false bottom, strainer means in the false bottom, the upper portions of the arms extending above and forward of the crate to provide a counterweight to balance said apex portion so that the container normally hangs with little force tending to force the container toward the sow.

5. In combination, a farrowing crate having upper rear corner portions, two generally rigid L-shaped arms having upper, lower and rearwardly projecting apex portions and mounted at arm upper portions on said corner portions for rearwardly swinging, an upwardly open container mounted on the lower arm portions transverse to the crate and near ground level under the posterior of a sow within the crate, a roller mounted on the lower arm portions above the container to engage rear portions of the sow within the crate, so that vertical movement of the arms due to swinging will not cause rubbing of the arms on the sow, said compartment having a false bottom, strainer means in the false bottom, and remote from the front of the container so that rear swinging of the arms and container will not tend to spill contents from beneath the false bottom, the upper portions of the arms extending above and forward of the crate for counterweight means to balance said apex portion so that the container normally hangs with little force tending to force the container toward the sow.

6. In combination, a farrowing crate having upper rear corner portions, two generally rigid L-shaped arms having upper, lower and rearwardly projecting apex portions and mounted at arm upper portions on said corner portions for rearwardly swinging, an upwardly open container mounted on the lower arm portions transverse to the crate and near ground level, a roller mounted on the lower arm portions across the rear of the crate above the container, and a pad having a flat part lying in the plane of the lower portions and below the roller so that when the rump of a sow engages the roller, the arms may swing rearwardly and the lower portions of the arm and the pad part may reach a nearly vertical position and act as a gate to retain the sow in the crate, the weight of the container tending to prevent the sow from swinging the lower portions substantially past vertical position.

7. In combination, a farrowing crate for containing a sow in an upright position therein, a pair of rigid L-shaped arms each including an upper portion and a lower portion which converge outwardly and rearwardly with their ends rigidly connected together at the central portion of the arm, said arms being pivotally connected by their upper portions to the upper rear portion of said farrowing crate for hanging pendent therefrom and for swinging rearwardly when force is exerted on said arms, the upper portions of said arms being adapted when said arms are hanging pendent to extend in a plane over the upper posterior of said sow, the lower portions of said arms being adapted when said arms are hanging pendent to extend in a plane inwardly and downwardly beneath said rear posterior of said sow, and an upwardly opening container carried between the lower ends of said lower portions of said arms for normally hanging in a position to be under said posterior of said sow, said container extending rearwardly from said lower ends and a roller carried between the intermediate portions of said lower arms, said roller normally being above said container in a position for engagement by said posterior of said sow when said sow moves rearwardly of said farrowing crate so that said container is urged rearwardly by said arms when said posterior forces said roller rearwardly, and a pad extending between said lower portions of said arms below said roller at the height of the hind legs of said sow for preventing chaffing engagement of said legs with said container.

References Cited in the file of this patent

UNITED STATES PATENTS

| | | |
|---|---|---|
| 595,504 | Underhill | Dec. 14, 1897 |
| 1,097,667 | Pfeifer | May 26, 1914 |